(12) United States Patent
Watanabe et al.

(10) Patent No.: US 11,079,625 B2
(45) Date of Patent: Aug. 3, 2021

(54) REFLECTION SHEET, LIGHTING DEVICE AND DISPLAY DEVICE

(71) Applicant: SHARP KABUSHIKI KAISHA, Sakai (JP)

(72) Inventors: Hisashi Watanabe, Sakai (JP); Hirotoshi Yasunaga, Sakai (JP); Youzou Kyoukane, Sakai (JP); Takeshi Masuda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 139 days.

(21) Appl. No.: 16/568,820

(22) Filed: Sep. 12, 2019

(65) Prior Publication Data

US 2020/0089051 A1 Mar. 19, 2020

Related U.S. Application Data

(60) Provisional application No. 62/732,237, filed on Sep. 17, 2018.

(51) Int. Cl.
*G02F 1/1335* (2006.01)
*G02F 1/13357* (2006.01)
*G02F 1/1333* (2006.01)

(52) U.S. Cl.
CPC .. *G02F 1/133553* (2013.01); *G02F 1/133345* (2013.01); *G02F 1/133605* (2013.01)

(58) Field of Classification Search
CPC ......... G02F 1/133603; G02F 1/133605; G02F 1/133553
See application file for complete search history.

(56) References Cited

U.S. PATENT DOCUMENTS

2007/0189011 A1* 8/2007 Song ................. F21V 29/71
362/294
2016/0139463 A1* 5/2016 Oh .................. G02F 1/133608
362/97.1

FOREIGN PATENT DOCUMENTS

JP 2018-018711 A 2/2018

* cited by examiner

*Primary Examiner* — Phu Vu
(74) *Attorney, Agent, or Firm* — ScienBiziP, P.C.

(57) ABSTRACT

A reflection sheet stacked on a mounting surface of a light source substrate on which light sources are mounted includes an insulating sheet and a reflection layer. The insulating sheet is made of an insulating material. The reflection layer includes a metal thin film stacked on the insulating sheet. Holes are drilled through the reflection layer and the insulating sheet in a stacking direction in which the reflection layer is stacked on the insulating sheet so that the light sources are exposed therethrough. The reflection layer is divided into divided reflection areas by slits. The holes are formed in the divided reflection areas, respectively.

12 Claims, 15 Drawing Sheets

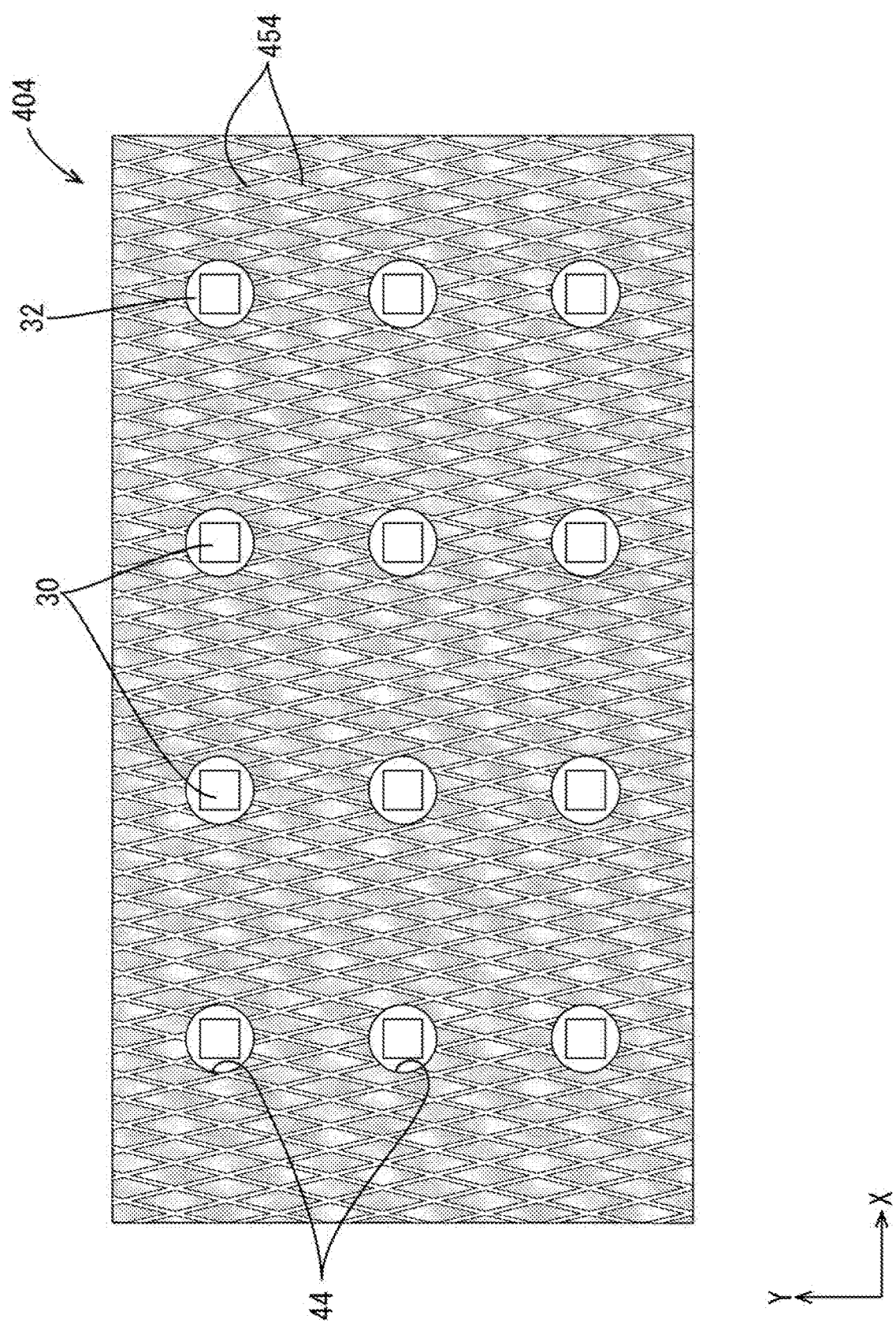

REFLECTION SHEET, LIGHTING DEVICE AND DISPLAY DEVICE

CROSS REFERENCE TO RELATED APPLICATION

This application claims priority from U.S. Provisional Patent Application No. 62/732,237 filed on Sep. 17, 2018. The entire contents of the priority application are incorporated herein by reference.

TECHNICAL FIELD

The technology described herein relates to a reflection sheet, a lighting device, and a display device.

BACKGROUND ART

Display devices that include display panels such as liquid crystal panels are used in portable information terminals, electronic devices, and television devices include display devices that include display panels. Examples of the portable information terminals include mobile phones, smartphones, and tablet-type notebook personal computers. Examples of the electronic devices include computers. In such display devices, the liquid crystal panels used in the display devices do not emit light and thus lighting devices, that is, backlight units are required. The backlight units include LED substrates that include substrates on which conductive patterns are formed and on which LEDs are mounted through soldering. The LEDs are light sources.

In areas of the LED substrate other than mounting areas in which the LEDs are mounted, a coating layer may be formed to improve insulating properties and reflectivity. Alternatively, a reflection sheet including holes through which the LEDs are exposed and having higher reflectivity may be disposed on a surface of the substrate on which the LEDs are mounted.

The reflectivity of the white resist is normally 90% or lower. Improvement of the reflectivity is expected. A reflection sheet that includes a metal reflection film having reflectivity higher than that of the white resist may be used. The metal reflection film in such a reflection sheet may contact solders and cause electrical conduction within a plane of the reflection sheet. This may cause malfunctions or failures of the LEDs. To reduce the electrical conduction, the reflection sheet needs to be accurately bonded to the LED substrate with an adhesive layer. The substrate on which the LEDs or other components are mounted is not flat and thus a roller cannot be used. Therefore, accurate bonding of the reflection sheet to the substrate without air bubbles may be difficult. Alternatively, a size of holes in the reflection layer may be increased. In such a configuration, the LED substrate or the conductive pattern having reflectivity lower than that of the reflection sheet or the white resist may be exposed resulting in a reduction in reflectivity. The reduction may cause reductions in brightness of the lighting device and the display device.

SUMMARY

The technology described herein was made in view of the above circumstances. An object is to provide a reflection sheet with higher reflectivity and to provide a lighting device and a display device that include such a reflection sheet and have higher brightness.

A reflection sheet stacked on a mounting surface of a light source substrate on which light sources are mounted includes an insulating sheet and a reflection layer. The insulating sheet is made of an insulating material. The reflection layer includes a metal thin film stacked on the insulating sheet. Holes are formed in the reflection layer and the insulating sheet in a stacking direction in which the reflection layer is stacked on the insulating sheet so that the light sources are exposed therethrough. The reflection layer is divided into divided reflection areas by slits. The holes are formed in the divided reflection areas, respectively.

A lighting device includes light sources, a light source substrate, and a reflection sheet. The light sources include pairs of electrodes. The light source substrate includes a mounting surface on which the light sources are mounted. The reflection sheet is stacked on the mounting surface of the light source substrate. The reflection sheet includes an insulating sheet that is made of an insulating material and a reflection layer that includes a metal thin film stacked on the insulating sheet. Holes are drilled through the reflection layer and the insulating sheet in a stacking direction in which the reflection layer is stacked on the insulating sheet at positions corresponding to the light sources so that the light sources are exposed therethrough. The reflection layer is divided into divided reflection areas by slits. The holes are formed in the divided reflection areas, respectively. Two mounting portions of the light source substrate on which two of the electrodes of corresponding one of the light sources disposed in one of the holes are mounted are projected from different two of the divided reflection areas and exposed through the hole when viewed in plan from a reflection sheet side.

A display device includes a lighting device described above and a display panel.

According to the technology described herein, a lighting device and a display device with higher brightness are provided.

BRIEF DESCRIPTION OF THE DRAWINGS

FIG. 16 is a plan view illustrating an LED substrate and a reflection sheet.

DETAILED DESCRIPTION

First Embodiment

An embodiment will be described with reference to FIGS. 1 to 5. In this embodiment section, a liquid crystal display device 10 (an example of a display device) including a liquid crystal panel 11 will be described. An upper side and a lower side in FIG. 1 correspond to a front side and a rear side of the liquid crystal display device 10. For multiple components having the same configuration, only one of those components may be indicated by a reference symbol and others may not be indicated by the reference symbol.

Liquid Crystal Display Device 10

The liquid crystal display device 10 has a rectangular shallow box shape as a whole. The liquid crystal display device 10 includes the liquid crystal panel 11 (an example of a display panel) and a backlight unit 20 (an example of a lighting device). The liquid crystal panel 11 is configured to display images. The backlight unit 20 is disposed behind the liquid crystal panel 11 and configured to supply light to the liquid crystal panel 11. The liquid crystal panel 11 and the backlight unit 20 are held together by a bezel 15 having a frame shape. The liquid crystal display device 10 according to this embodiment may be used for a television device.

Liquid Crystal Panel 11

The liquid crystal panel 11 has a known configuration in detail. The configuration includes two substrates each having rectangular shapes bonded together with a predefined gap therebetween and a liquid crystal layer between the substrates. The substrates include glass substrates, respectively. Each of the glass substrates may be non-alkaline glass having high light transmissivity. Multiple films are stacked on each of the glass substrates through known photolithography.

One of the substrates on the rear side (the lower side in FIG. 1) is an array substrate that includes switching components (i.e., TFTs) connected to source lines and gate lines that are perpendicular to each other, pixel electrodes that are connected to the switching components, and an alignment film. The other one of the substrates on the front side (the upper side in FIG. 1) is a CF substrate that includes color filters, a common electrode, and an alignment film. The color filters include red (R), green (G), and blue (B) color portions arranged in a predefined pattern. Image data and various control signals required for displaying images are supplied to the source lines, the gate lines, and the common electrode by a control circuit board. Polarizing plates are disposed on outer surfaces of the substrates. The liquid crystal panel 11 displays imaged using the light supplied by the backlight unit 20. The front side of the liquid crystal panel 11 is a light exiting side.

Bezel 15

Figure 1:
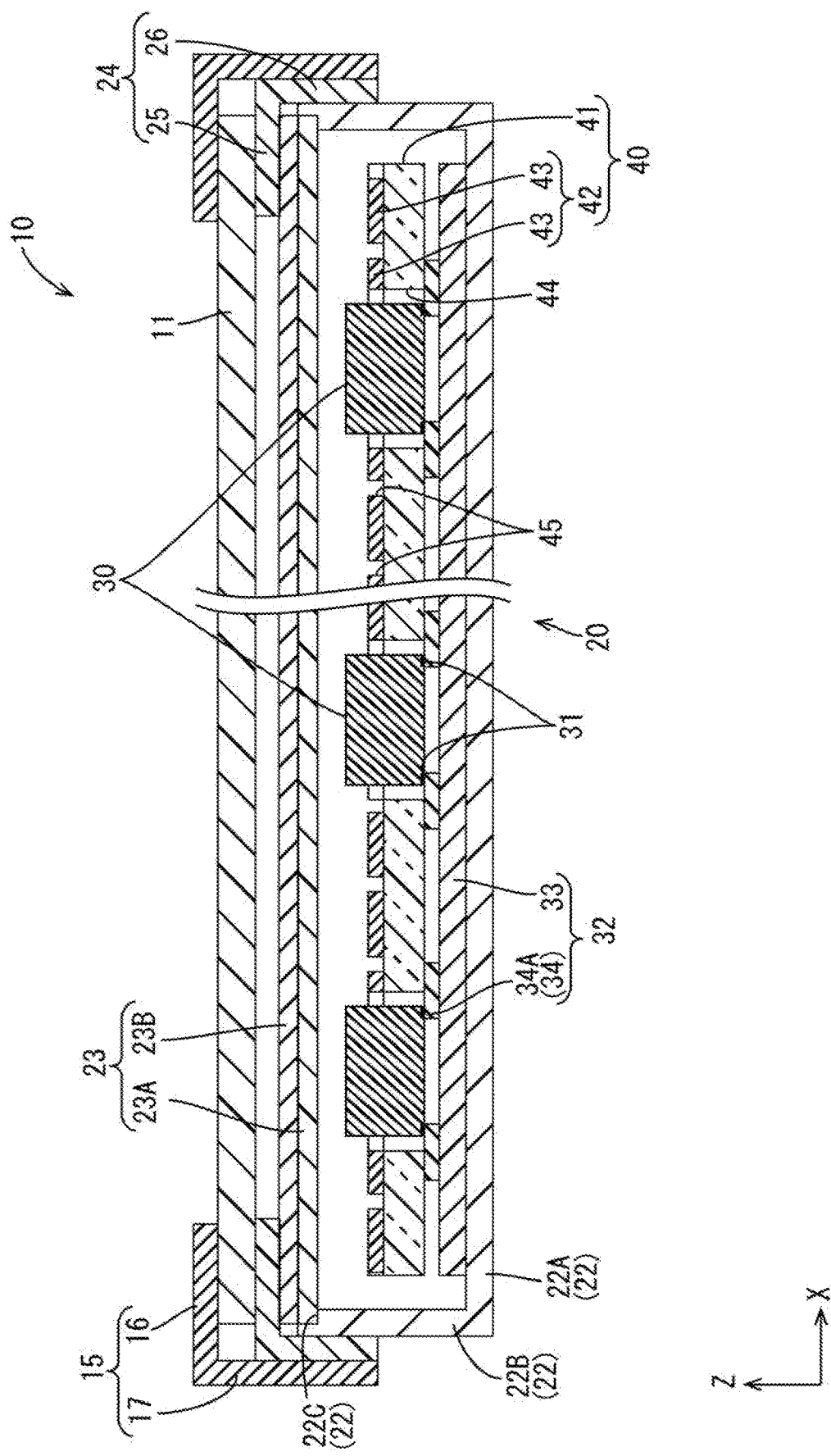
FIG. 1 is a side cross-sectional view of a liquid crystal display device according to a first embodiment.

The bezel 15 is made of metal such as aluminum. The bezel 15 has a rectangular frame shape as a whole. As illustrated in FIG. 1, the bezel 15 includes a panel holding portion 16 and a periphery portion 17. The panel holding portion 16 holds an outer edge portion of the liquid crystal panel 11 for an entire perimeter from the front side. The periphery portion 17 protrudes from a peripheral edge portion of the panel holding portion 16 to the rear side to surround the outer periphery of the backlight unit 20 (a periphery portion 26 of a frame 24, which will be described later). The liquid crystal panel 11 is the bezel 15 sandwiched between the bezel 15 and the backlight unit 20 and held.

Backlight Unit 20

As illustrated in FIG. 1, the backlight unit 20 includes a chassis 22, an optical member 23, and the frame 24. The chassis 22 has a box shape with an opening on the liquid crystal panel 11 side. The optical member 23 is disposed to cover the opening of the chassis 22. The frame 24 is disposed along outer edges of the chassis 22 so that an outer edge portion of the optical member 23 is sandwiched between the chassis 22 and the frame 24.

In the chassis 22, LEDs 30 are disposed at positions directly behind the optical member 23 (the liquid crystal panel 11) to be opposed to the optical member 23 and an LED substrate 32 on which the LEDs 30 are mounted are disposed. The backlight unit 20 in this embodiment is a direct backlight. The LED substrate 32 is held at a predefined position by a holding mechanism. Next, the components of the backlight unit 20 will be described.

Chassis 22

The chassis 22 is prepared from an aluminum sheet or an electrolytic zinc-coated steel sheet (SECC). The chassis 22 has a shallow box shape (a shallow tray shape) as a whole with an opening on the front side. The chassis 22 includes a bottom plate 22A and side plates 22B. The bottom plate 22A has a horizontally-long rectangular shape similar to the shape of the liquid crystal panel 11. The side plates 22B project from outer edges of the bottom plate 22A toward the front side (the light exiting side, the side on which the LEDs 30 are disposed), respectively. Inner portion of distal ends of the side plates 22B are cut out so that the distal ends form L shapes and receiving portions 22C on which ends of the optical member 23 are placed. The optical member 23 placed on the receiving plates 22C of the chassis 22 are held by the frame 24 from the front side.

Optical Member 23

The optical member 23 is for converting light emitted by the LEDs 30 into uniform planar light. The optical member 23 has a horizontally-long rectangular shape similar to the shapes of the liquid crystal panel 11 and the chassis 22 in a plan view. As illustrated in FIG. 1, the outer edges of the optical member 23 are placed on the receiving portions 22C so that the optical member 23 covers the opening of the chassis 22. The optical member 23 is disposed between the liquid crystal panel 11 and the LEDs 30 (the LED substrate 32).

More specifically, the optical member 23 is disposed opposite on the front side relative to the LEDs 30, that is, on the light exiting side with a predetermined distance away from the LEDs 30. The optical member 23 in this embodiment includes a diffuser plate 23A on the rear side (the LED 30 side) and an optical sheet 23B on the front side (the liquid crystal panel 11 side, the light exiting side). The diffuser plate 23A includes a base made of substantially transparent resin and formed in a plate shape with a predefined thickness and diffuser particles disposed in the base. The diffuser plate 23A has a function of diffusing light that passes through the diffuser plate 23A. The optical sheet 23B includes sheets having a thickness smaller than the thickness of the diffuser plate 23A. The sheets included in the optical member 23 may be selected from a fluorescence emission sheet, a diffuser sheet, a prism sheet, and a polarized reflection sheet where appropriate.

Frame 24

The frame 24 is made of resin such as white polycarbonate having higher reflectivity. The frame 24 includes a sheet holding portion 25 and the periphery portion 26. The sheet holding portion 25 has a frame shape along the outer edge portion of the optical member 23 to sandwich the edges of the optical member 23 with the receiving portions 22C of the chassis 22. The periphery portion 26 projects from an outer edge portion of the sheet holding portion 25 toward the rear side to surround the side plates 22B of the chassis from the outer periphery. The sheet holding portion 25 receives the edges of the liquid crystal panel 11 from the rear side. The edges of the liquid crystal panel 11 are sandwiched between the panel holding portion 16 of the bezel 15 on the front side and the sheet holding portion 25 (see FIG. 1).

LEDs 30

The LEDs 30 are mounted on the LED substrate 32. A light emitting surface of each LED 30 is facing an opposite side from the LED substrate 32. Namely, the LEDs 30 are top-emitting LEDs. The light emitting surfaces of the LEDs 30 are opposed to the plate surface of the optical member 23. Each LED 30 includes an LED chip (an LED component), which is a semiconductor light emitting component, sealed by a resin material on a substrate that is disposed on the plate surface of the LED substrate 32. The LED chip mounted on the substrate is configured to have one kind of main light emission wavelength, specifically, to emit light in a single color of blue. The resin material that seals the LED chip contains phosphors that emit a predefined color of light when excited by the blue light emitted by the LED chip. The phosphors are dispersed in the resin material. Therefore, substantially white light is emitted. An LED that includes a sealing resin material that does not contain phosphors may be used. Alternatively, an LED chip may be mounted without sealed by the resin material. Because the LED emits blue light, the fluorescent emission sheet may be required for the optical sheet 23B so that white light is emitted.

The LEDs 30 in this embodiment use the flip-chip packaging technology. Each LED 30 includes two electrodes 31 disposed on a surface opposed to the LED substrate 32.

LED Substrate 32

As illustrated in FIG. 1, the LED substrate 32 (an example of a light source substrate) has a horizontally-long rectangular shape similar to the shape of the bottom plate 22A of the chassis 22. The LED substrate 32 is disposed to extend along the bottom plate 22A and held in the chassis 22. The LED substrate 32 includes a base 33 made of an insulating material such as glass epoxy, polyimide, and aluminum. A conductive pattern 34 is formed on a surface of the LED substrate 32 opposed to the optical member 23 (an upper surface in FIG. 1, hereinafter referred to as a mounting surface 32A). The conductive pattern 34 is prepared from a metal film such as a copper foil and insulated from the base 33.

The LEDs 30 having the configuration described earlier are mounted on the conductive pattern 34 using the flip-chip packaging technology. Specifically, the electrodes of each LED 30 are electrically connected to the corresponding electrode pads 34A (an example of mounting portions) of the conductive pattern 34 with solders 34 (illustrated only in the plan view). Driving power is supplied to the LEDs 30 by an LED driver circuit board (a light source driver circuit board) connected to the conductive pattern 34.

Figure 4:
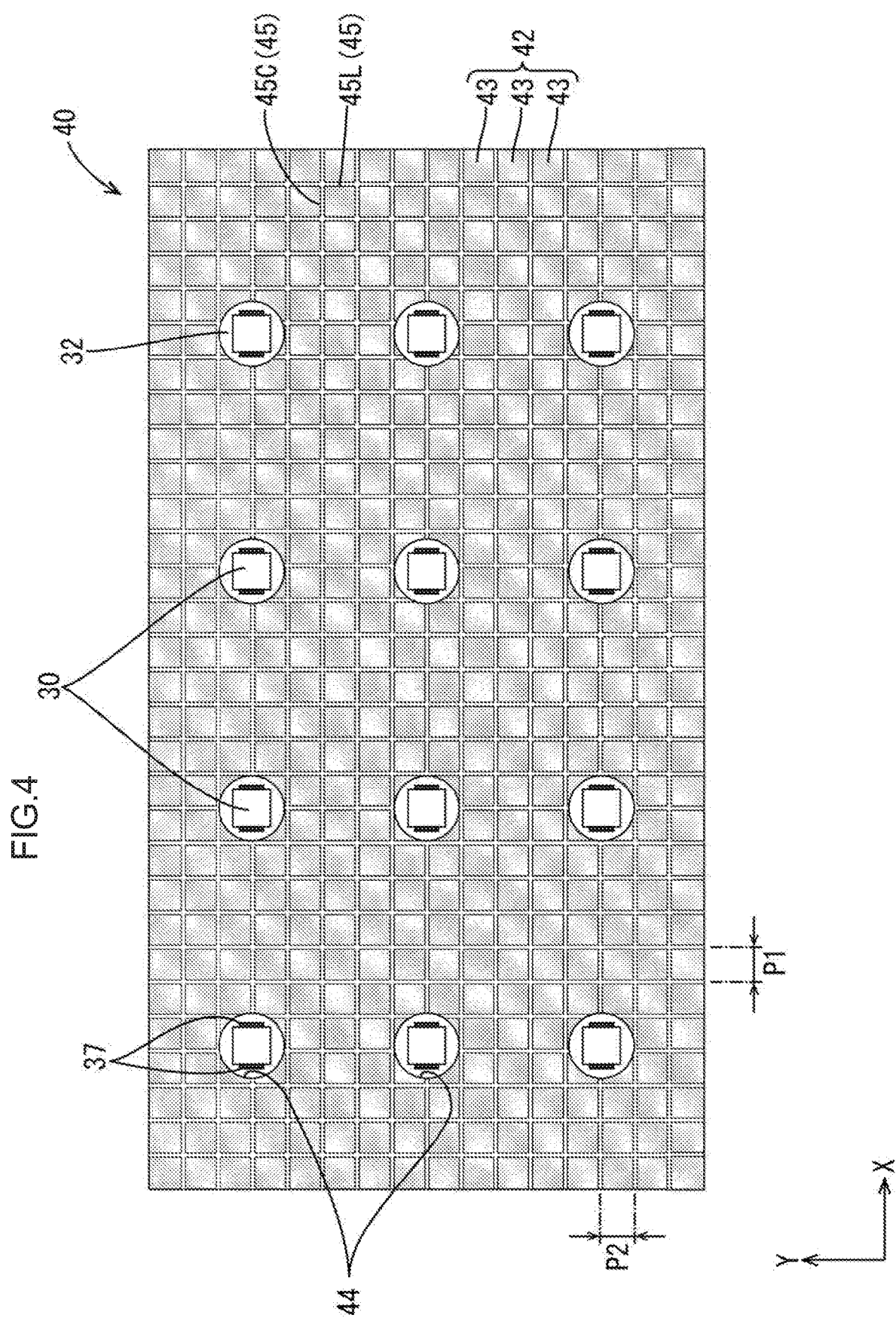
FIG. 4 is a plan view illustrating the reflection sheet stacked on the LED substrate.

As illustrated in FIG. 4, the LEDs 30 are arranged along the long edge (the X direction) and the short edge (the Y direction) of the LED substrate 32. Specifically, four along the X direction by three along the Y direction, that is, twelve LEDs 30 are arranged in a matrix. Intervals of the LEDs 30 are constant (equal) in the X direction and the Y direction. In this embodiment, the electrodes 31 in each LED 30 are arranged in the X direction of the LED substrate 32 (see FIG. 5). This embodiment is an example and the number of the LEDs may be altered according to specifications including screen sizes and required brightness.

Rays of light emitted by the LEDs 30 and returned to the LED substrate 32 are reflected by a reflection sheet 40 on the mounting surface 32A of the LED substrate 32 toward the front side and included in the emitting light.

Reflection Sheet 40

Next, the reflection sheet 40 will be described in detail. As illustrated in FIGS. 1 and 3, the reflection sheet 40 is prepared by laminating a metal thin film (hereinafter referred to as a metal reflection layer 42) made of silver, aluminum, silver alloy, or aluminum alloy and having higher light reflectivity to one of surfaces of the insulating sheet 41 made of insulating resin such as PET through spattering or vapor deposition. The reflection sheet 40 is overlaid on the LED substrate 32 to cover the front surface of the LED substrate 32 (on a mounting surface 32A side) with the insulating sheet 41 opposed to the LED substrate 32. The reflection sheet 40 extends parallel to the bottom plate 22A of the chassis 22 and the plate surface of the optical member 23. Distances between the optical member 23 and the reflection sheet 40 in the normal direction are substantially constant within an entire area of the reflection sheet 40. With the reflection sheet 40, the rays of light returned to the LED substrate 32 are reflected toward the front side (the light exiting side, the optical member 23 side). A protective layer 49 for reducing metal deterioration or a reflection enhancement layer for increasing the reflectivity may be formed on the metal reflection layer 42. The protective layer 49 is provided in FIGS. 2F and 2G but omitted in other drawings.

The thickness of the metal reflection layer 42 of the reflection sheet 40 is preferably within a range from 0.05 μm to 1 μm. If the thickness is less than 0.05 μm, sufficient reflectivity cannot be achieved. If the thickness is greater than 1 μm, warp of the insulation sheet 41 may occur and it may be difficult to form fine slits 45, which will be described later. For the reasons, the range is proper.

As illustrated in FIG. 3, the reflection sheet 40 includes holes 44 that drilled through the reflection sheet 40 in a thickness direction (a stacking direction in which the metal reflection layer 42 is stacked on the insulation sheet 41). The holes 44 are located at positions corresponding to the LEDs 30 when the reflection sheet 40 is overlaid on the LED substrate 32 so that the LEDs 30 are exposed. Each hole 44 has a round shape slightly larger than a perimeter of the corresponding LED 30. End surfaces of the metal reflection layer 42 exposed in inner walls of the holes 44 (in the holes 44). Two electrodes 31 of each LED 30 disposed in the corresponding hole 44 are electrically connected to electrode pads 34A (an example of a mounting portion) of the conductive pattern 34 on the LED substrate 32 exposed in the hole 44 with solders 37.

As illustrated in FIG. 4, the slits 45 are formed in the metal reflection layer 42 of the reflection sheet 40. The slits 45 are arranged at equal intervals in rows and columns along the long edge (the X direction) and the short edge (the Y direction) of the LED substrate 32 and continuously from a first end to a second end of the metal reflection layer 42 in an extending direction of the metal reflection layer 42. The metal reflection layer 42 is divided into square areas by the slits 45. The square areas are arranged in a grid. The areas of the metal reflection layer 42 divided by the slits 45 (areas defined by the slits 45) will be referred to as divided reflection areas 43. The adjacent divided reflection areas 43 are insulated from each other by the slits 45.

Widths of the slits 45 are preferably in a range from 3 μm to 30 μm. If the widths are less than 3 μm, electrically conductive portions may be formed depending on accuracy in slit formation and electrical insulation may be instable. If the widths are greater than 30 μm, an exposed area of the surface of the insulating sheet 41 having the lower reflectivity increases and thus overall reflectivity of the reflection sheet 40 decreases.

The slits 45 are formed in the metal reflection layer 42 such that at least one of the slits 45 is provided in each of the areas between the holes 44 that are vertically, horizontally, or diagonally adjacent to each other. Namely, the holes 44 are provided in the divided reflection areas 43, respectively. Therefore, the areas between the adjacent holes 44 are electrically insulated from one another. Even if the solders 37 that electrically connect the electrodes 31 to the electrode pads 34A in the hole 44 contact the metal reflection layer 42 at two or more points of the reflection sheet 40, the areas between the holes 44 are less likely to be electrically connected to each other via the metal reflection layer 42. In this embodiment, as illustrated in FIG. 4, a pitch P1 of the vertical slits 45L arranged at equal intervals is defined in the horizontal direction (the X direction). A pitch P2 of the horizontal slits 45C arranged at equal intervals is defined in the vertical direction (the Y direction). The pitches P1 and P2 are equal to each other (P1=P2).

Figure 5:
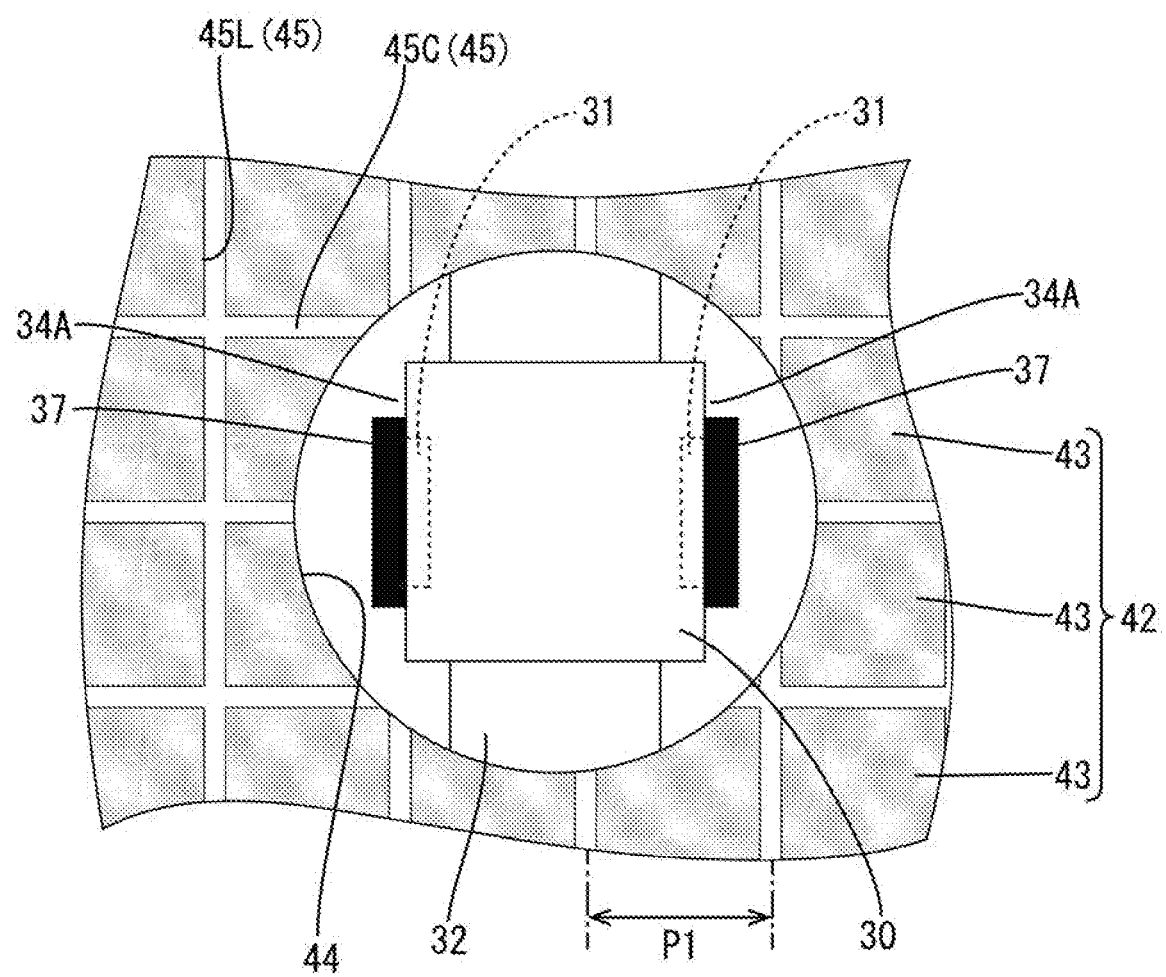
FIG. 5 is a magnified view of a portion of FIG. 4.

As illustrated in FIG. 5, two electrode pads 34A (an example of a mounting portion) to which two electrodes 31 of the corresponding LED 30 disposed in each hole 44 are disposed through the hole 44. The slits 45 are formed such that at least one extended line of the slits 45 is drawn between the electrode pads 34A in the hole 44. Namely, the electrode pads 34A disposed in the hole 44 are projected from the different divided reflection areas 43 and exposed through the hole 44 when viewed in plan. With this configuration, the electrode pads 34A are electrically insulated from each other. Even if solders 37 at the electrodes 31 contact the metal reflection layer 42 in the hole 44, the electrodes 31 are less likely to be electrically connected to each other via the metal reflection layer 42.

According to the configuration, the electrodes 31 of the different LEDs 30 and the electrodes 31 of each LED 30 are less likely to be electrically connected to each other due to the contact of the solders 37 with the metal reflection layer 42. Therefore, the diameter of the holes 44 can be set as small as possible. Namely, the exposed areas of the LED substrate 32 and the conductive pattern 34 through the holes 44 can be reduced and thus the overall reflectivity of the reflection sheet 40 can be increased.

The pitches P1 and P2 of the slits 45 may be set in a range from 0.1 mm to 5 mm. If the pitches P1 and P2 of the slits 45 are greater than 5 mm, pitches of the holes 44 and the LEDs 30 need to be increased resulting in a reduction in brightness. Uneven brightness is more likely to occur. If the pitches P1 and P2 of the slits 45 are less than 0.1 mm, the number of the slits 45 increases and a larger area of the insulating sheet 41 having the lower reflectivity is exposed. Therefore, the brightness decreases.

Figure 6:
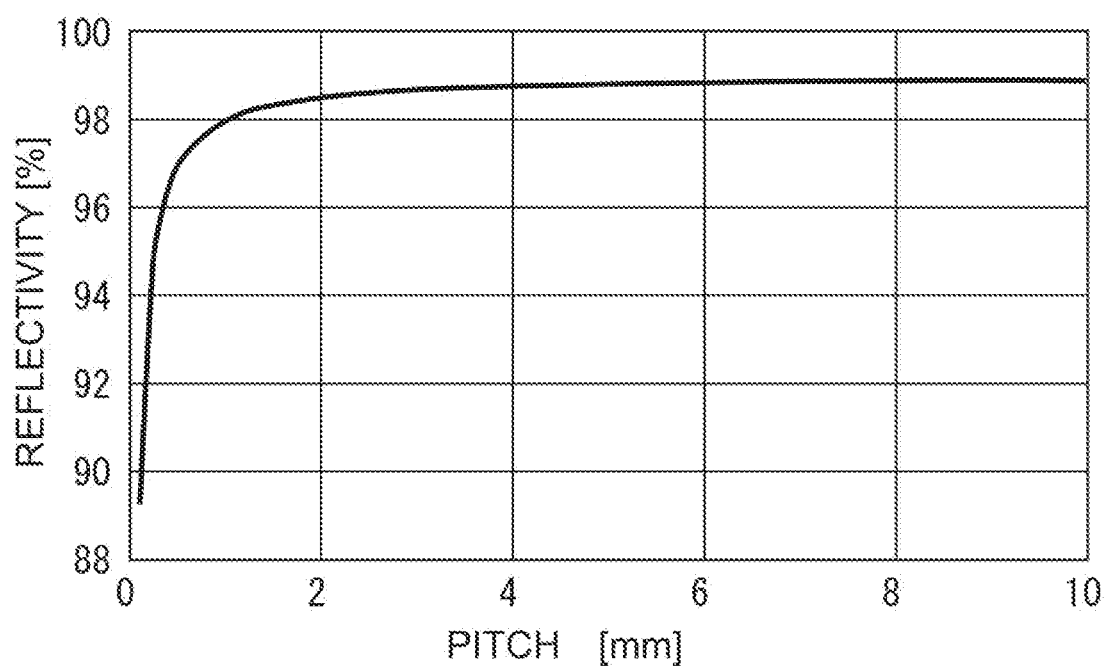
FIG. 6 is a graph illustrating a relation between a pitch of slits and reflectivity.

FIG. 6 is a graph illustrating a relation between the pitch of the slits 45 and the reflectivity when the width of the slits 45 is set to 5 μm. When the pitch of the slits 45 is 0.1 mm, the reflectivity is about 90%. When the pitch is 0.1 mm or greater, effect greater than that of the white coating (the reflectivity of 90% or less) can be achieved. When the pitch is 0.5 mm or greater, the reflectivity is 97% or higher, that is, higher reflectivity can be achieved. When the pitch is 1.5 mm or greater, the reflectivity is 98.5% or higher, that is, a decrease in reflectivity due to the slits 45 is less likely to be observed. Therefore, it is preferable that the pitches P1 and P2 are in a range from 0.1 to 5 mm.

Figure 2A:
FIG. 2A is a schematic view illustrating a step in a production process of a reflection sheet (reflection layer formation).

The configuration is as described above. Next, a method of producing the reflection sheet 40 will be described. As illustrated in FIG. 2A, the metal reflection layer 42 having higher reflectivity is formed on the surface of the insulating sheet 41 made of an insulating material such as PET through vapor deposition or spattering. The metal reflection layer 42 is made of silver, aluminum, or an alloy containing silver or aluminum.

Figure 2B:
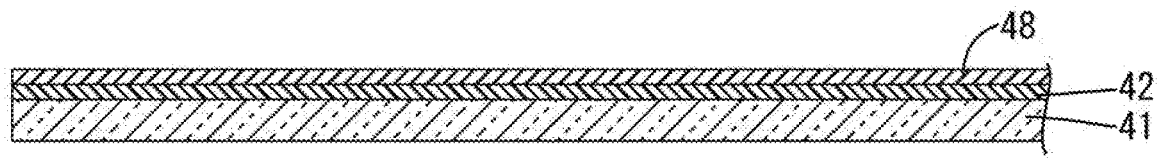
FIG. 2B is a schematic view illustrating a step in the production process of the reflection sheet (resist formation).

Next, the slits 45 are formed in the reflection sheet 40. The slits 45 may be formed through known photolithography. As illustrated in FIG. 2B, a photoresist layer 48 is formed by evenly applying liquid photoresist to the metal reflection layer 42 through printing or a dry film resist may be bonded to the metal reflection layer 42.

Figure 2C:
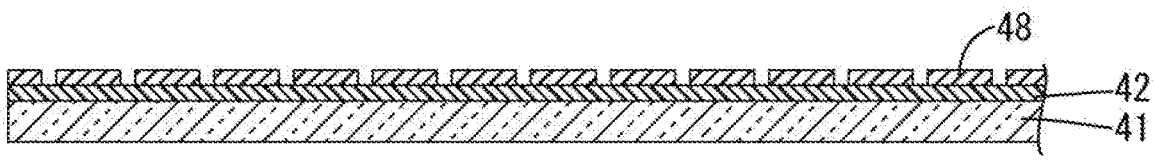
FIG. 2C is a schematic view illustrating a step in the production process of the reflection sheet (exposure and development).

Next, the photoresist layer 48 is exposed to light with a proper wavelength via a photomask and developed to remove unnecessary portions of the photoresist layer 48 (see FIG. 2C). In this embodiment, the portions of the photoresist layer 48 are removed to form the slits 45.

Figure 2D:
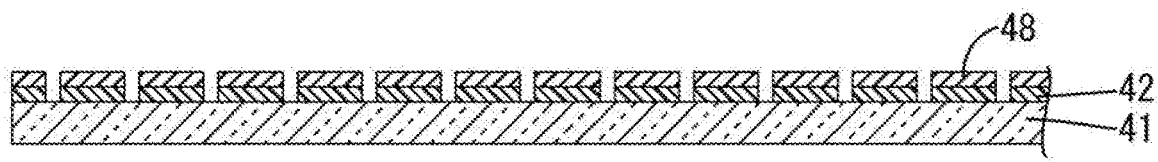
FIG. 2D is a schematic view illustrating a step in the production process of the reflection sheet (etching).
Figure 2E:
FIG. 2E is a schematic view illustrating a step in the production process of the reflection sheet (resist removal).

Next, as illustrated in FIG. 2D, portions of the metal reflection layer 42 on which the portions of the photoresist layer 48 are not disposed are removed through wet etching or dry etching. The remaining portions of the photoresist layer 48 are removed in a resist stripper (see FIG. 2E). Through such processing, the slits 45 are formed.

Figure 2F:
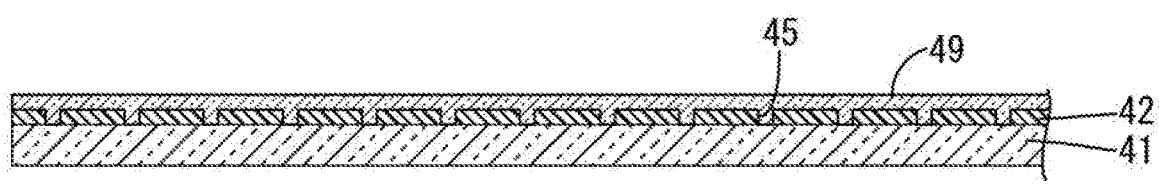
FIG. 2F is a schematic view illustrating a step in the production process of the reflection sheet (protective layer formation).
Figure 2G:
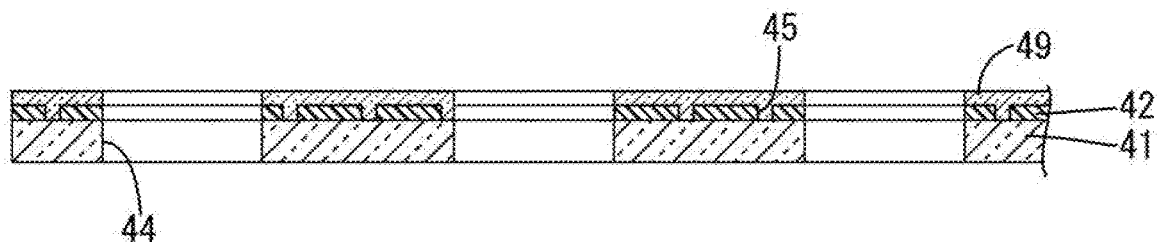
FIG. 2G is a schematic view illustrating a step in the production process of the reflection sheet (hole formation).
Figure 3:
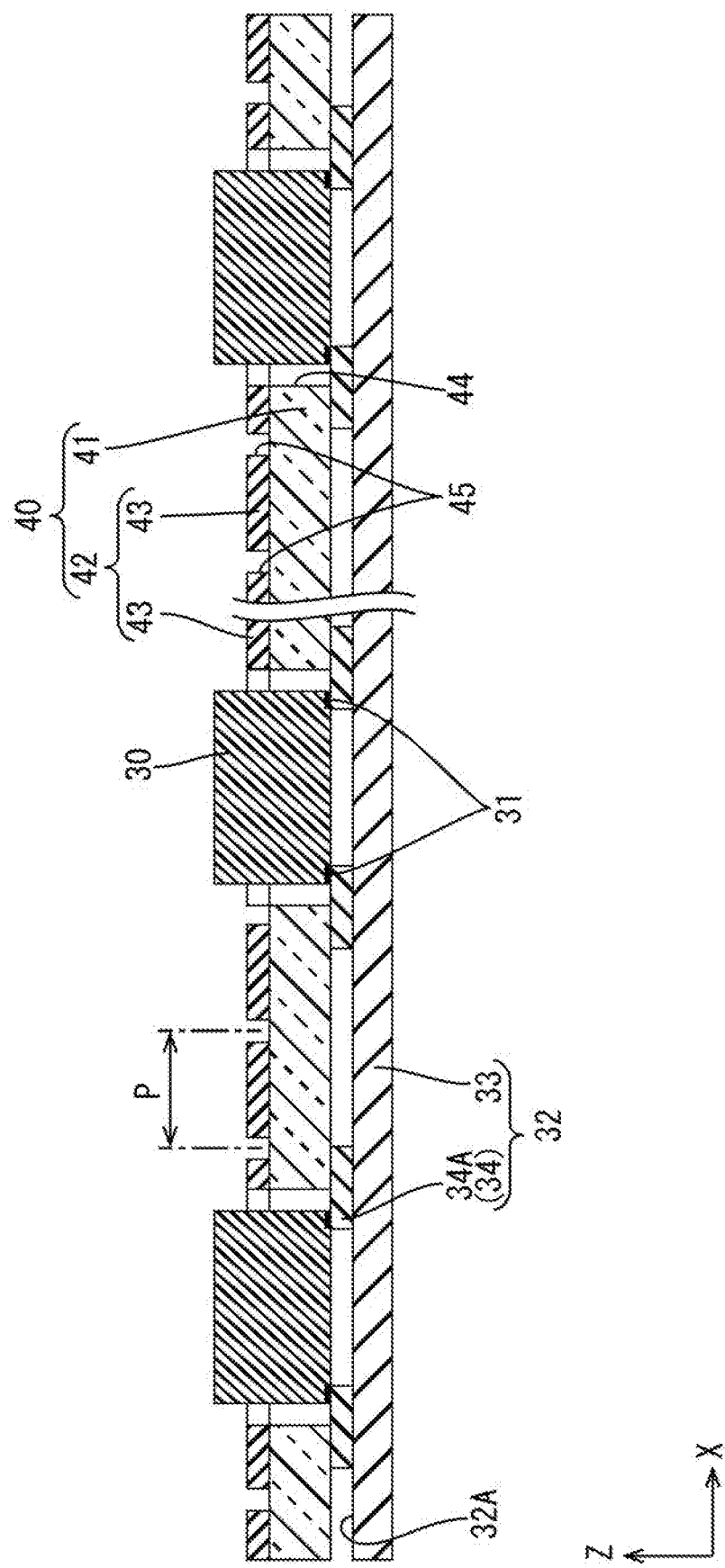
FIG. 3 is a side cross-sectional view illustrating the reflection sheet stacked on an LED substrate.

As illustrated in FIG. 2F, the protective layer 49 or the reflection enhancement layer may be formed through application or bonding where appropriate. Finally, the holes 44 are formed at predefined positions by punching (see FIG. 2G). Through such processing the reflection sheet 40 in this embodiment is completed.

In this embodiment, as illustrated in FIG. 4, the reflection sheet 40 includes the slits 45 that are linearly arranged at equal intervals along the long edges and the short edges of the reflection sheet 40 and the square divided reflection areas 43 that are arranged in the grid. The reflection sheet 40 having such a configuration in this embodiment is stacked on the mounting surface 32A of the LED substrate 32 on which the LEDs 30 are mounted, as illustrated in FIG. 3.

When the liquid crystal display device 10 is turned on, the driving of the liquid crystal panel 11 is controlled by the panel control circuit on the control circuit board, and the driving of the LEDs 30 on the LED substrate 32 is controlled by the LED driver circuit on the LED driver circuit board.

The light from the LEDs 30 that are turned on is applied to the optical member 23 (the diffuser plate 23A and the optical sheet 23B). After predefined optical effect is deserted on the light by the optical member 23, the light is applied to the liquid crystal panel 11 and used for display of an image based on the display pixels in the liquid crystal panel 11.

Functional effect of the reflection sheet 40 and the backlight unit 20 in this embodiment will be described. The reflection sheet 40 in this embodiment is overlaid on the mounting surface 32A of the LED substrate 32 on which the LEDs are mounted. The reflection sheet 40 includes the insulating sheet 41 made of the insulating material and the metal reflection layer 42 that is a metal thin film laminated on the insulating sheet 41. The holes 44 are formed in the metal reflection layer 42 and the insulating sheet 41 in the stacking direction so that the LEDs 30 are exposed therethrough. The metal reflection layer 42 is divided into the divided reflection areas 43 by the slits 45. The holes 44 are provided in the divided reflection areas, respectively.

The backlight unit 20 in this embodiment includes the LEDs 30, the LED substrate 32, and the reflection sheet 40. Each LED 30 includes two electrodes 31. The LEDs 30 are mounted on the mounting surface 32A of the LED substrate 32. The reflection sheet 40 is overlaid on the mounting surface 32A of the LED substrate 32. The reflection sheet 40 includes the insulating sheet 41 made of the insulating material and the metal reflection layer 42 that is the metal thin film laminated on the insulating sheet 41. The reflection sheet 40 includes the holes 44 at the positions corresponding to the LEDs 30. The holes 44 are drilled through the metal reflection layer 42 and the insulating sheet 41 in the stacking direction so that the LEDs 30 are exposed through the holes 44. The metal reflection layer 42 is divided into the divided reflection areas 43 by the slits 45. The holes 44 are formed in the different divided reflection areas 43. Two electrodes 31 of the LED 30 located in one of the holes 44 are mounted on the electrode pads 34A on the LED substrate 32. The electrodes pads 34A are projected from the different divided reflection areas 43 and exposed through the though hole 44.

According to the reflection sheet 40 and the backlight unit 20, because the reflection sheet 40 includes the metal reflection layer 42 that is made of metal, higher reflectivity can be achieved. In this configuration, the solders 37 that connect the LEDs 30 to the conductive pattern 34 (the electrode pads 34A) in the LED substrate 32 may contact the metal reflection layer 42 exposed through the holes 44 in the reflection sheet 40 and electrical conduction may occur within the plane of the metal reflection layer 42.

Figure 7:
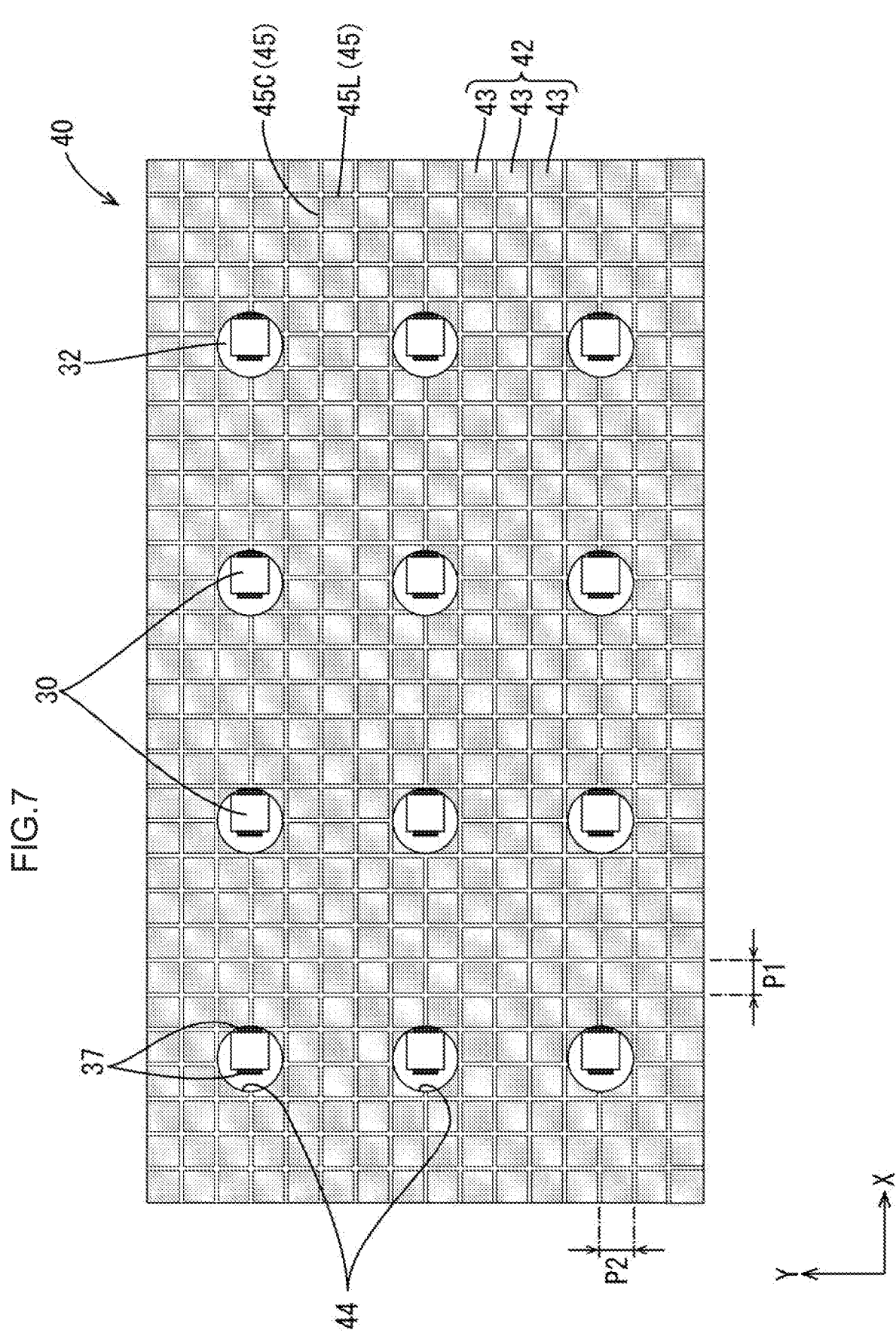
FIG. 7 is a plan view illustrating the LED substrate and the reflection sheet that are displaced from each other.

In this embodiment, the metal reflection layer 42 is divided into the divided reflection areas 43 and the holes 44 are formed in the divided reflection areas, respectively. The areas between any two of the holes 44 are separated by the slits 45 and insulated from one another. Even if the reflection sheet 40 is displaced as illustrated in FIG. 7 and the solders 37 contact the metal reflection layer 42 exposed through the holes 44 at two or more points, the areas between the holes 44 are less likely to be electrically connected via the metal reflection layer 42.

Two electrode pads 34A exposed through one hole 44 are exposed through the different divided reflection areas 43 and the areas between two electrode pads 34A are separated by the slits 45 from one another. Even if the solders 37 that connect two electrodes 31 of the LED 30 disposed in one hole 44 to the electrode pads 34A contact the metal reflection layer 42 exposed through the hole 44, the electrodes 31 are less likely to be electrically connected via the metal reflection layer 42.

According to the configuration, the diameter of the holes 44 can be set as small as possible. Therefore, the exposed areas of the LED substrate 32 and the conductive pattern 34 having the lower reflectivity through the holes 44 can be reduced and the area of the reflection sheet 40 (the metal reflection layer 42) having the higher reflectivity can be increased. The light use efficiency increases and the brightness of the backlight unit 20 and thus the brightness of the liquid crystal display device 10 can be increased.

With the reflection sheet 40 having the higher reflectivity in the backlight unit 20 in this embodiment, the backlight unit 20 and the liquid crystal display device 10 having the higher brightness can be provided.

Second Embodiment

Figure 8:
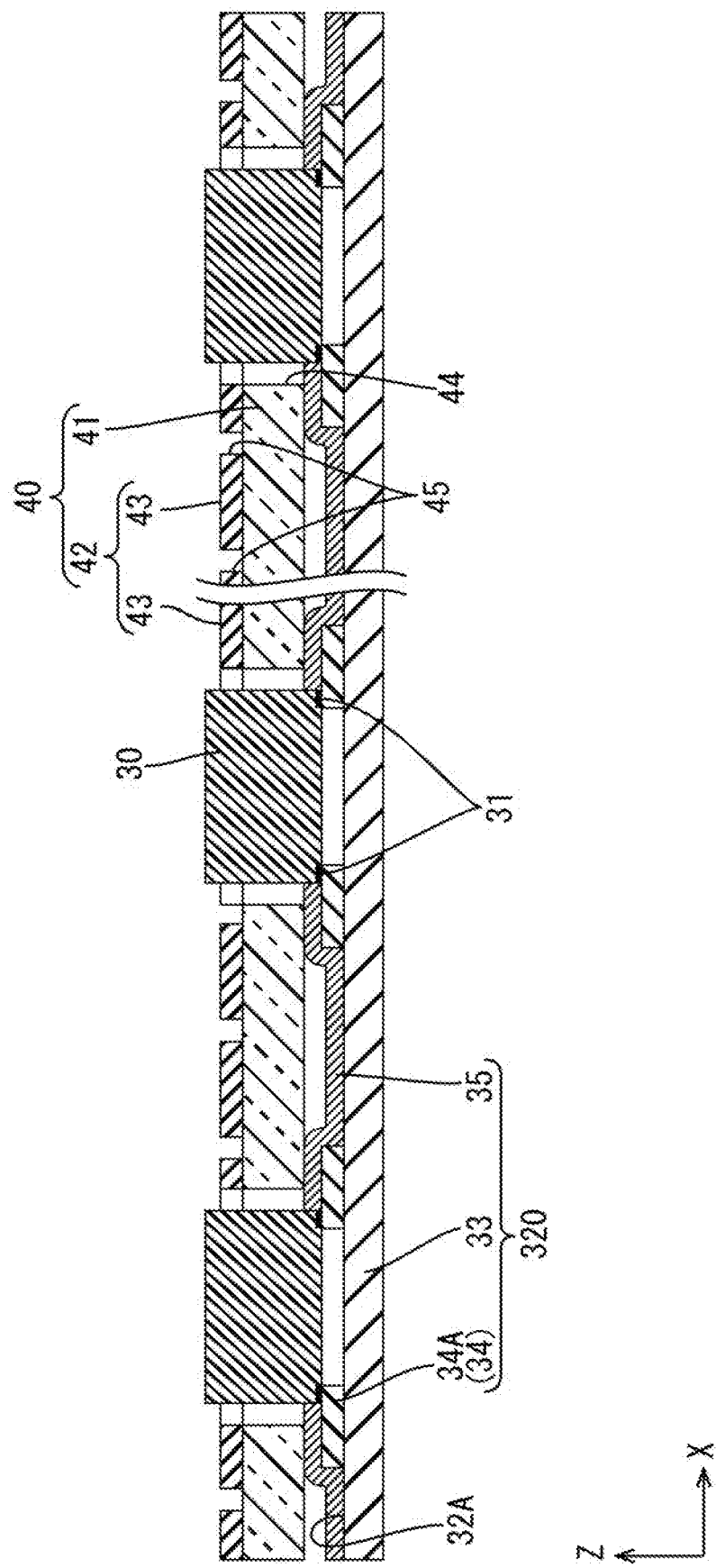
FIG. 8 is a side cross-sectional view illustrating the reflection sheet stacked on an LED substrate in a second embodiment and a third embodiment.

A second embodiment will be described with reference to FIG. 8. Configurations different from those of the first embodiment will be described. Configurations similar to those of the first embodiment will be indicated by the symbols the same as those of the first embodiment and will not be described.

On a mounting surface 32A of an LED substrate 320 in this embodiment, a white resist layer 35 (an example of a paint layer) which exhibits a white color is formed in areas other than the electrode pads 34A. This is different from the first embodiment. Namely, the white resist layer 35 is formed is formed on surfaces of the conductive pattern 34, excluding the electrode pads 34A, and the exposed base 33. In this configuration, it is preferable that the insulation sheet 41 of the reflection sheet 40 is made of a transparent material having higher transmissivity. According to the configuration, the reflectivity of the exposed areas through the slits 45 in the metal reflection layer 42 and the holes 44 increase. Therefore, overall reflectivity of the backlight unit 20 further increases.

Third Embodiment

A third embodiment has the same configuration as that of the second embodiment except for the insulation sheet 41 of the reflection sheet 40. The insulation sheet 41 is made of a white material such as white PET. Configurations illustrated in the drawing are similar to those of the second embodiment (FIG. 8).

According to this embodiment, areas of the metal reflection layer 42 exposed through the slits 45 are made of the white material. Therefore, the overall reflectivity of the reflection sheet 40 increases. In the areas exposed through the holes 44, the white resist layer 35 is formed and thus the reflectivity in the holes 44 increases. Therefore, overall brightness of the backlight unit 20 can be increased.

Fourth Embodiment

Figure 9:
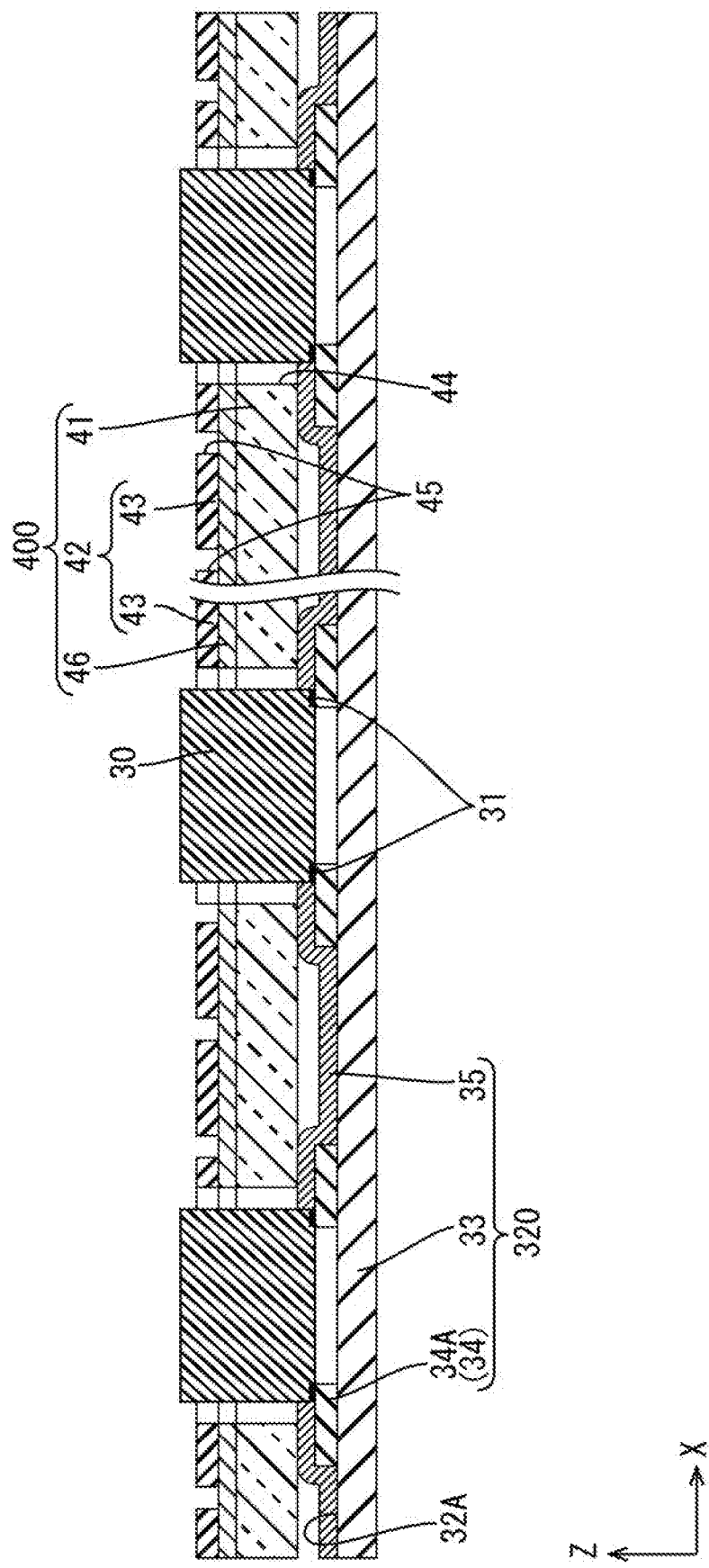
FIG. 9 is a side cross-sectional view illustrating the reflection sheet stacked on an LED substrate in a fourth embodiment.

A fourth embodiment will be described with reference to FIG. 9. This embodiment has configurations the same as those of the second embodiment; however, this embodiment further includes a sheet-side white resist layer 46 (an example of an auxiliary reflection layer) between the insulating sheet 41 and the metal reflection layer 42 in a reflection sheet 400. This is different from the second embodiment.

According to this embodiment having such configurations in which areas of the metal reflection layer 42 exposed through the slits 45 are portions of the sheet-side white resist layer 46 and thus the reflectivity of the reflection sheet 400 increases. Therefore, the overall brightness of the backlight unit 20 can be increased.

Fifth Embodiment

Figure 10:
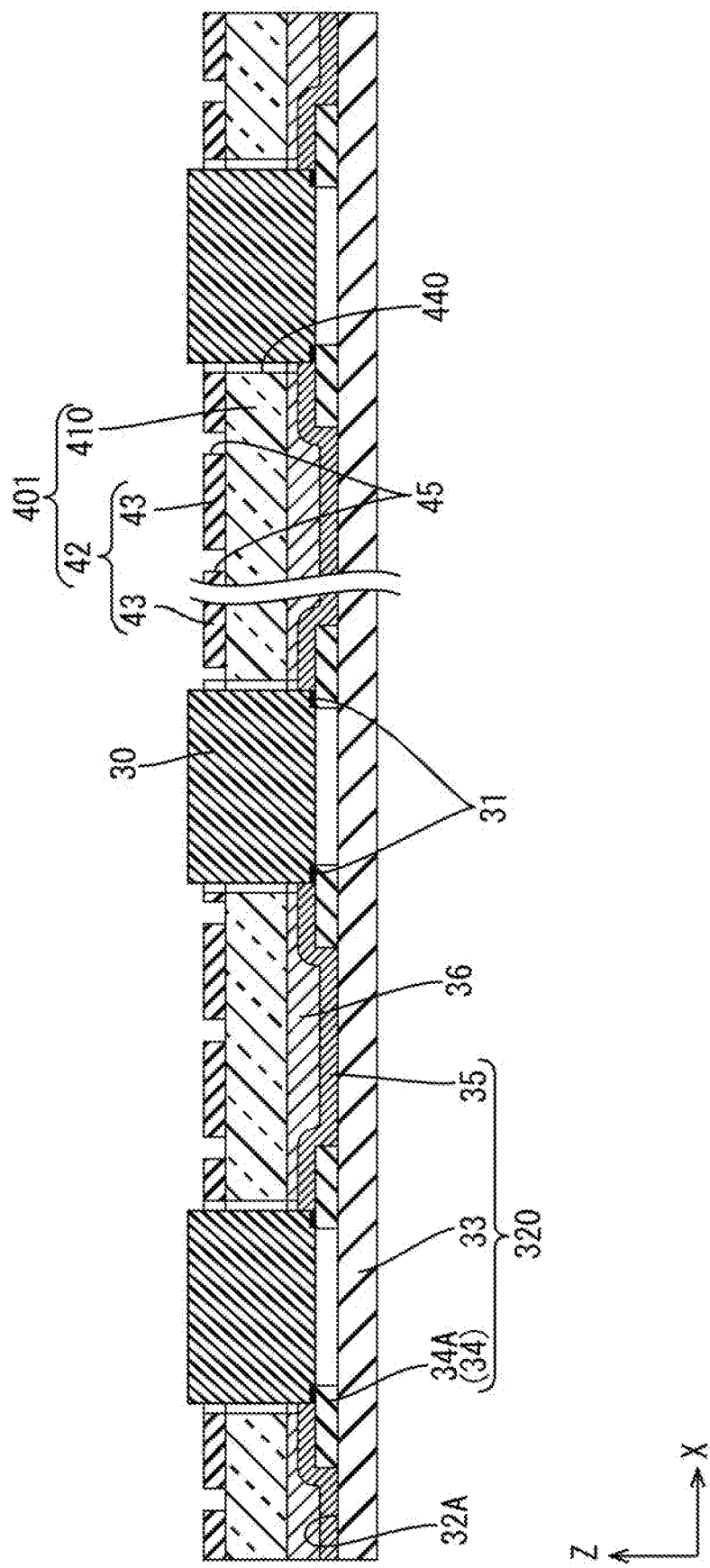
FIG. 10 is a side cross-sectional view illustrating the reflection sheet stacked on an LED substrate in a fifth embodiment.

A fifth embodiment will be described with reference to FIG. 10. In this embodiment, an insulating sheet 410 of a reflection sheet 401 is made of a heat resistant material having a heat resistant temperature higher than a melting temperature of the solders 37 that connect the electrodes 31 to the electrode pads 34A. An example of such a material is polyimide. According to the configuration, the reflection sheet 401 is bonded with an adhesive (an adhesive layer 36) before the LEDs 30 are mounted on the LED substrate 32 and then the LEDs 30 are mounted through reflow mounting. Namely, the reflection sheet 401 is accurately bonded to the LED substrate 320 that is flat using a roller, a jig, or a general bonding machine. Therefore, a size of holes 440 can be reduced and thus the brightness of the backlight unit 20 can be further increased.

Sixth Embodiment

A sixth embodiment will be described with reference to FIGS. 11 and 12. This embodiment includes an LED substrate and a reflection sheet applied to an edge light type backlight unit.

Figure 11:
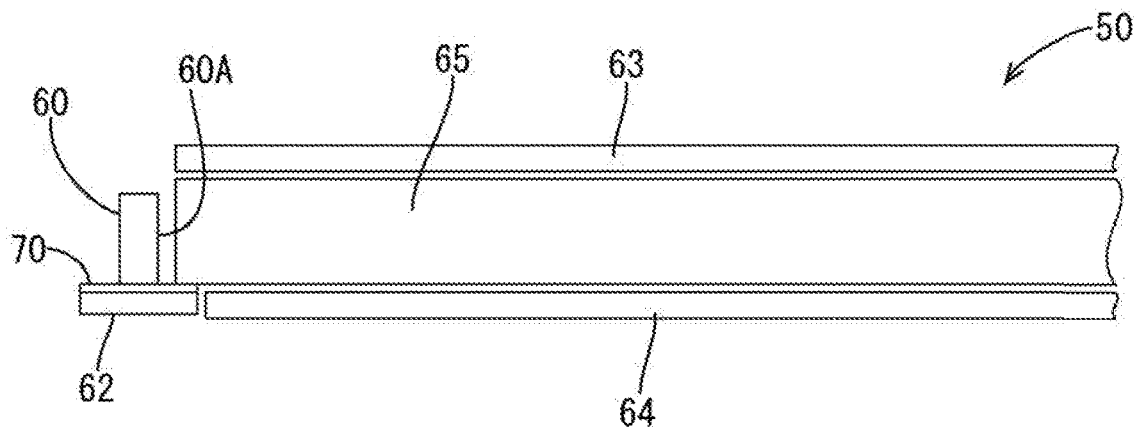
FIG. 11 is a schematic side view of a relevant portion of a backlight unit in a sixth embodiment.

As illustrated in FIG. 11, a backlight unit 50 in this embodiment includes side emitting LEDs 60, an LED substrate 62, a reflection sheet 70, and a light guide plate 65. The LEDs 60 are mounted on the LED substrate 62. The reflection sheet 70 is stack on a mounting surface of the LED substrate 62. The light guide plate 65 is formed in a rectangular plate shape and configured to guide light emitted by the LEDs 60 through light emitting surfaces 60A. The light emitting surfaces 60A of the LEDs 60 are opposed to one of surfaces of the light guide plate 65. An optical member 63 in a sheet shape is disposed on a front side of the light guide plate 65. A light guide plate reflection sheet 64 is disposed on a back side of the light guide plate 65.

Figure 12:
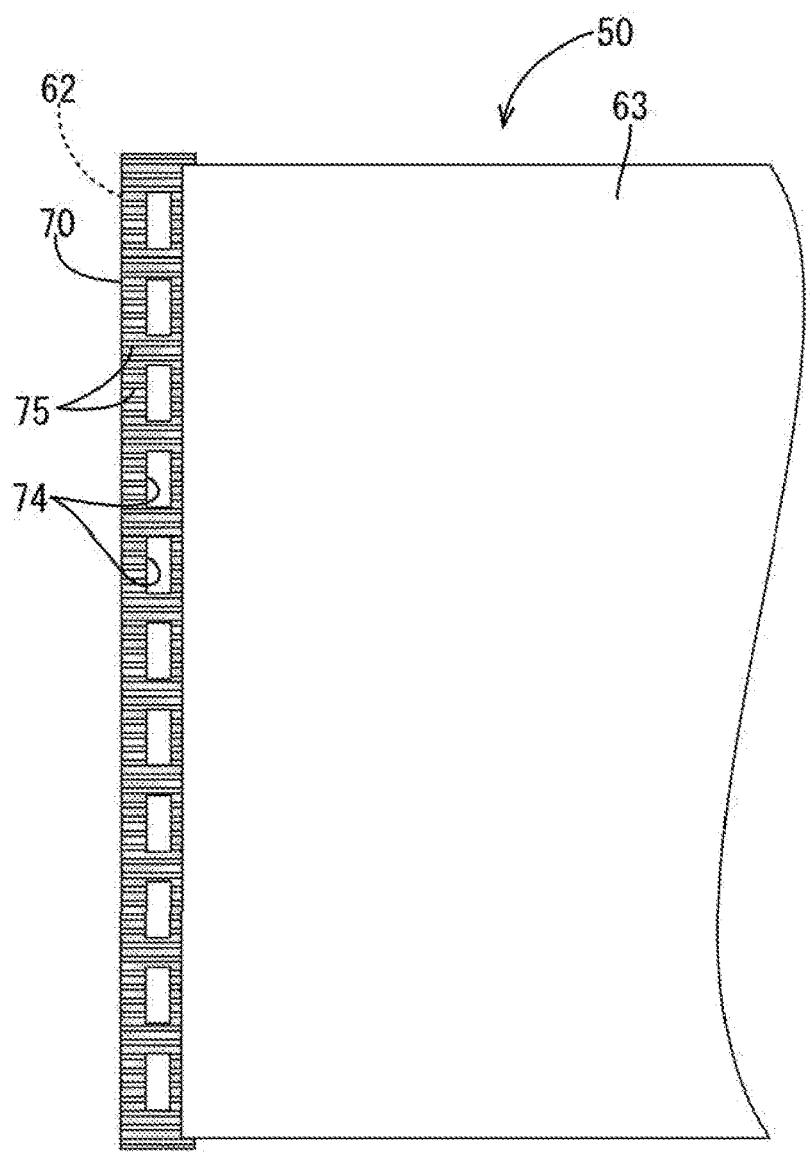
FIG. 12 is a schematic plan view of the relevant portion of the backlight unit.

As illustrated in FIG. 12, the LED substrate 62 has a band shape. The LEDs 60 are arranged in line along a longitudinal direction of the LED substrate 62 and mounted on the LED substrate 62. Two electrodes of each LED 60 are arranged along the longitudinal direction of the LED substrate 62 (the vertical direction in FIG. 12). Slits 75 are formed in a metal reflection layer of the reflection sheet 70 that is stacked on the LED substrate 62. The slits 75 extend in a direction perpendicular to an arrangement direction of holes 74 (the horizontal direction in FIG. 12) through which the LEDs 60 are exposed (an arrangement direction of the LEDs 60). With the slits 75, areas between the adjacent holes 74 are insulated from one another. Electrode pads on which electrodes of the corresponding LEDs 60 disposed in each hole 74 are mounted are insulated from each other by the slits 75.

In such a configuration, that is, in which the LEDs are arranged in line and mounted, slits that extend in one direction may be formed or slits may be formed in a grid similar to the above embodiment.

According to the backlight unit 50 in this embodiment, the light is reflected by the reflection sheet 70 that is stacked on the LED substrate 62 toward the light exiting side (the front side) with higher reflectivity. According to the configuration, the brightness of the backlight unit 50 can be increased.

Modification of Sixth Embodiment

Figure 13:
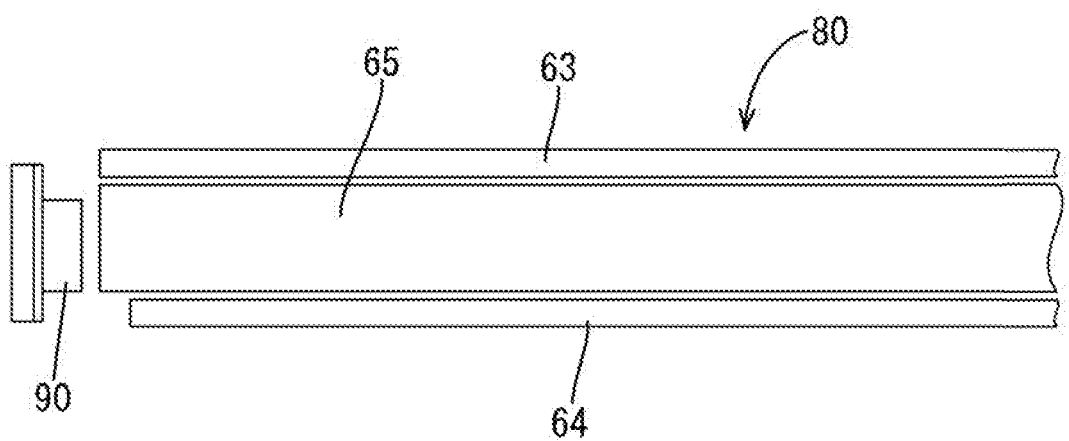
FIG. 13 is a schematic side view of a relevant portion of a backlight unit in a modification of the sixth embodiment.

In the sixth embodiment, the LEDs 60 that are the side emitting type LEDs are used in the edge light type backlight unit 50. However, an edge light type backlight unit 90 including top emitting type LEDs 90 may be used as illustrated in FIG. 13.

Other Embodiments

The technology described herein is not limited to the embodiments described in the above descriptions and drawings. The following embodiments may be included in the technical scope of the technology described herein.

Figure 14:
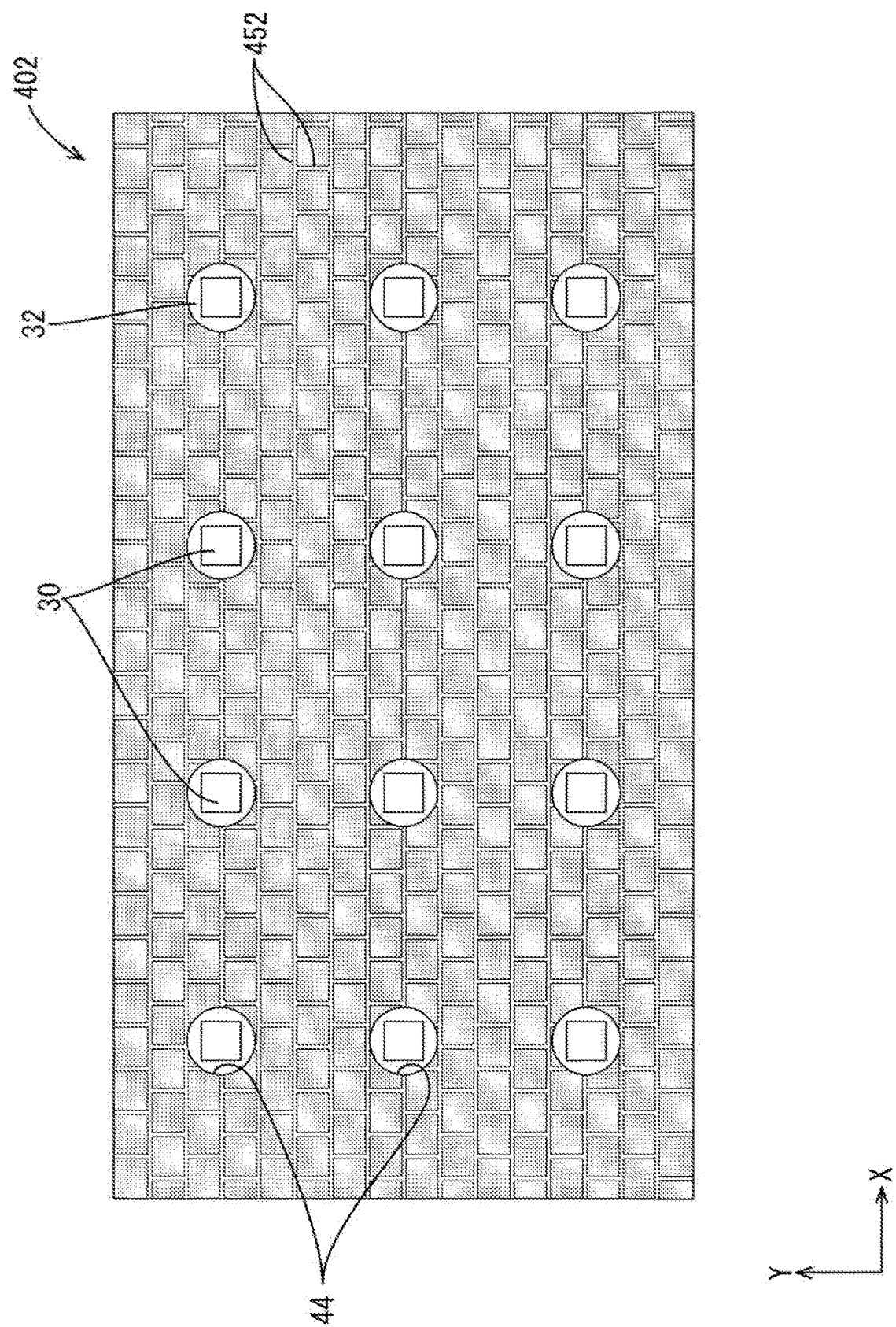
FIG. 14 is a plan view illustrating an LED substrate and a reflection sheet in another embodiment.
Figure 15:
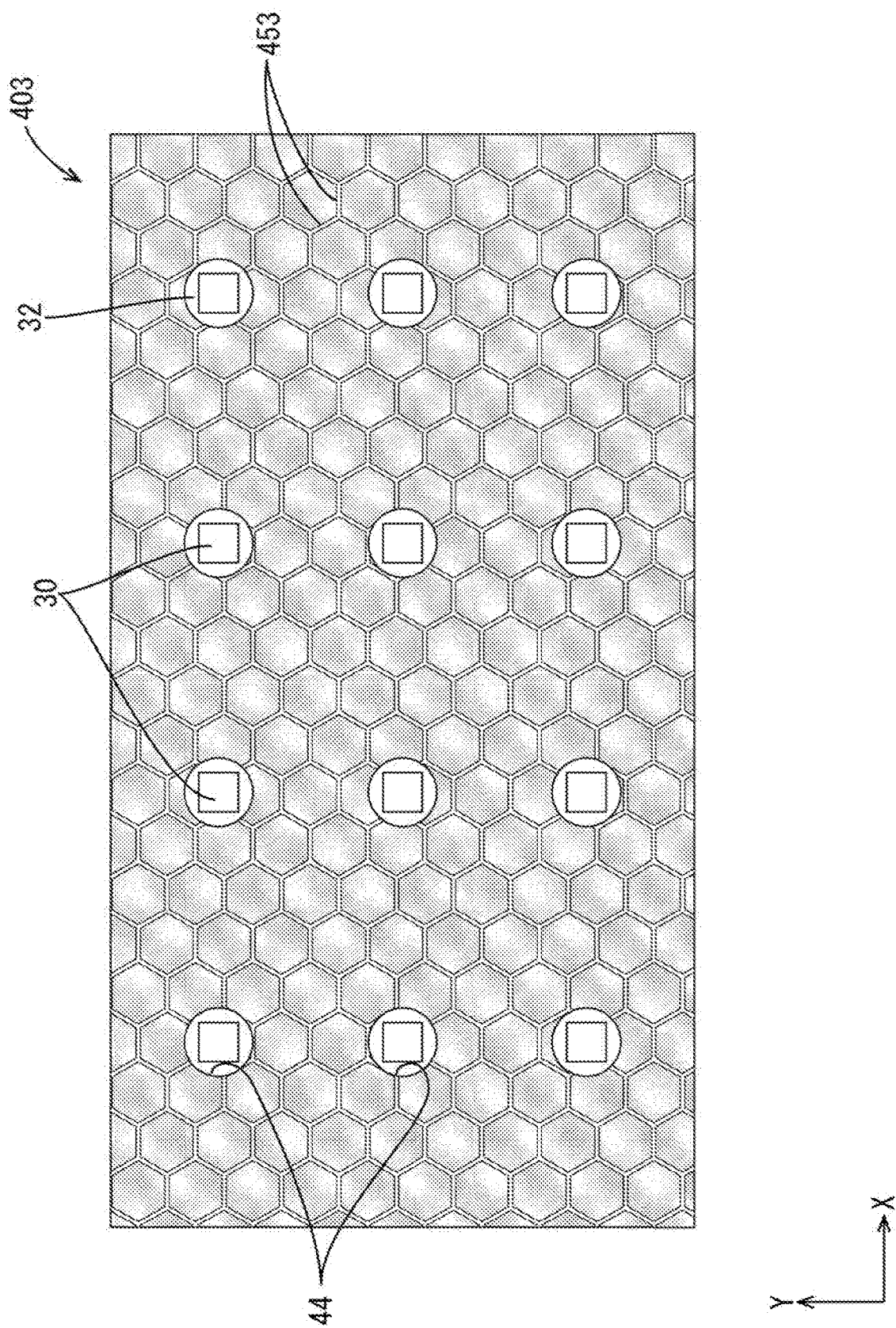
FIG. 15 is a plan view illustrating an LED substrate and a reflection sheet.

(1) The configurations of the slits in the reflection sheet 40 is not limited to those of the above embodiments. A reflection sheet 402 that includes slits 452 in the same shape in the same size arranged in a brick pattern in the reflection sheet 402 as illustrated in FIG. 14, a reflection sheet 403 that includes slits 453 in regular hexagon arranged in a honeycomb pattern as illustrated in FIG. 15, a reflection sheet 404 that includes slits 454 in a diamond mesh pattern as illustrated in FIG. 16, reflection sheets that include slits in irregular patterns, and reflection sheets that include slits in various patterns may be included in the scope of the technology described herein. The slits can be arranged in any pattern as long as at least one slit is provided between the adjacent holes 44 and the slits is formed so that at least one extending line passes between two electrodes 31 within one hole 44 and electrical connection within the plane is reduced.

(2) In the above embodiments, the reflection sheet 40 includes the insulating sheet 41 that is opposed to the LED substrate 32. However, if the insulating layer such as the protective layer 49 is formed on the surface of the metal reflection layer 42 and the insulating sheet 41 is made of a light transmissive material, the front and the rear are reversed and the metal reflection layer 42 may be opposed to the LED substrate 32.

(3) In the third, the fourth, and the fifth embodiments, the LED substrate 320 includes the white resist layer 35. However, a configuration without the white resist layer 35 may be included in the technical scope.

(4) In the sixth embodiment, the slits 75 are formed in the reflection sheet 70 in one direction. However, slits may be provided in two or more direction in a configuration in which LEDs are disposed in line.

The invention claimed is:

1. A reflection sheet stacked on a mounting surface of a light source substrate on which light sources are mounted, the reflection sheet comprising:
    an insulating sheet made of an insulating material; and
    a reflection layer including a metal thin film stacked on the insulating sheet, wherein
    holes are drilled through the reflection layer and the insulating sheet in a stacking direction in which the reflection layer is stacked on the insulating sheet so that the light sources are exposed therethrough,
    the reflection layer includes reflection segments that are physically and electrically isolated from each other by slits, and
    the holes are formed in the reflection segments, respectively.

2. A lighting device comprising:
    light sources including pairs of electrodes;
    a light source substrate including a mounting surface on which the light sources are mounted; and
    a reflection sheet stacked on the mounting surface of the light source substrate, wherein the reflection sheet includes:
        an insulating sheet made of an insulating material; and a reflection layer including a metal thin film stacked on the insulating sheet, holes are drilled through the reflection layer and the insulating sheet in a stacking direction in which the reflection layer is stacked on the insulating sheet at positions corresponding to the light sources so that the light sources are exposed therethrough, the reflection layer is divided into divided reflection areas by slits, the holes are formed in the divided reflection areas, respectively, and two mounting portions of the light source substrate on which two of the pair of electrodes of a corresponding one of the light sources disposed in one of the holes are mounted are projected from a different two of the divided reflection areas and exposed through the hole when viewed in a plan view from a reflection sheet side.

3. The lighting device according to claim 2, wherein a paint layer made of a white material is formed in an area of the mounting surface of the light source substrate other than areas to which the electrodes are electrically connected.

4. The lighting device according to claim 3, wherein the insulating sheet of the reflection sheet is made of a transparent material.

5. The lighting device according to claim 2, wherein the insulating sheet of the reflection sheet is made of a white material.

6. The lighting device according to claim 2, wherein an auxiliary reflection layer made of a white material is disposed between the insulating sheet and the reflection layer of the reflection sheet.

7. The lighting device according to claim 2, wherein the insulating sheet of the reflection sheet is made of a heat resistant material, and an adhesive layer is disposed between the reflection layer and the light source substrate.

8. The lighting device according to claim 2 further comprising a light guide plate including a plate shaped member and an end surface through which light from the light sources enters.

9. The lighting device according to claim 2, wherein the reflection layer has a thickness in a range from 0.05 μm to 1 μm.

10. The lighting device according to claim 2, wherein the slits have widths in a range from 3 μm to 30 μm.

11. The lighting device according to claim 2, wherein the slits are arranged at equal intervals with a pitch in a range from 0.1 mm to 5 mm.

12. A display device comprising:

a lighting device according to claim 2; and a display panel.

* * * * *